United States Patent Office 3,454,030
Patented July 8, 1969

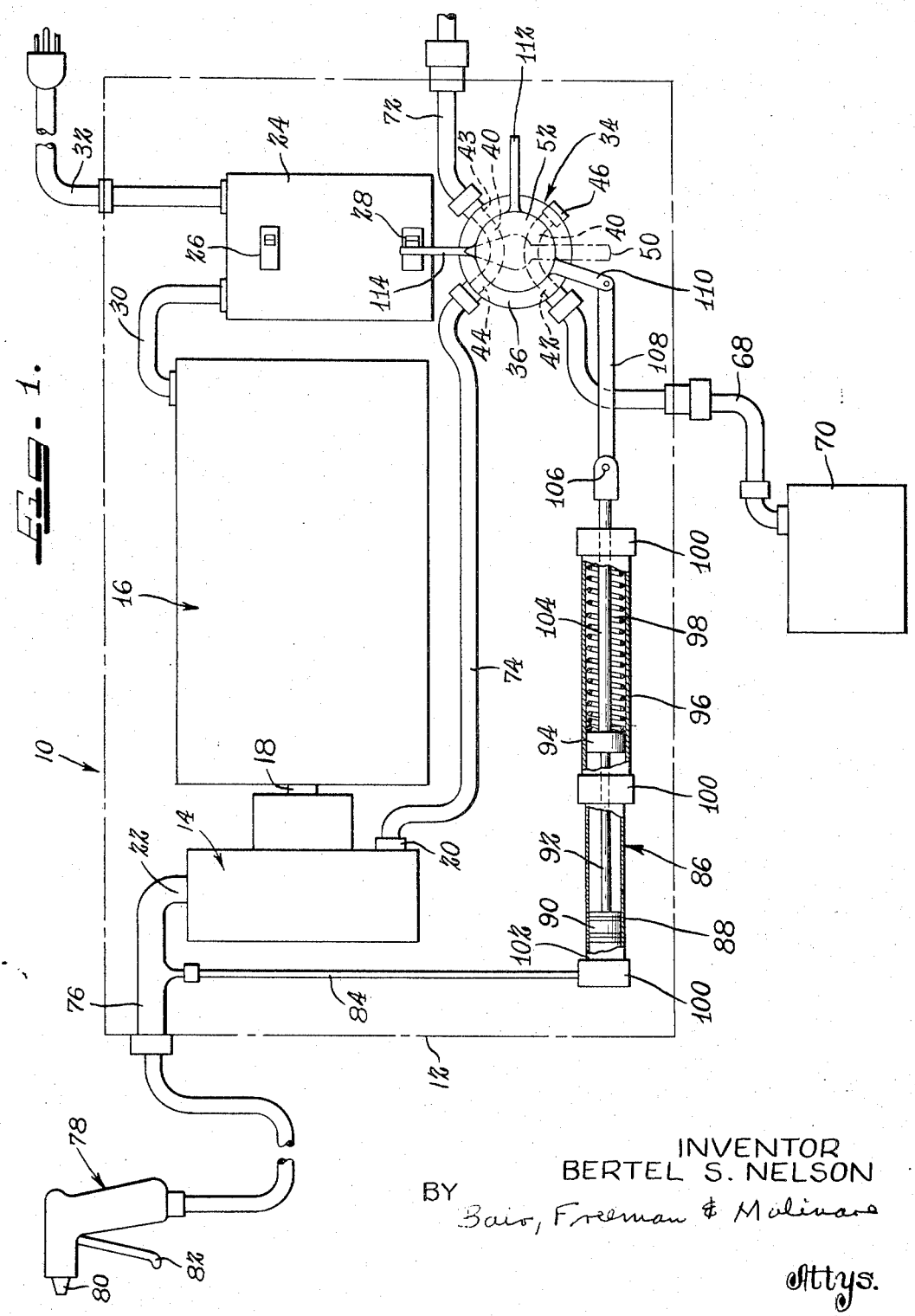

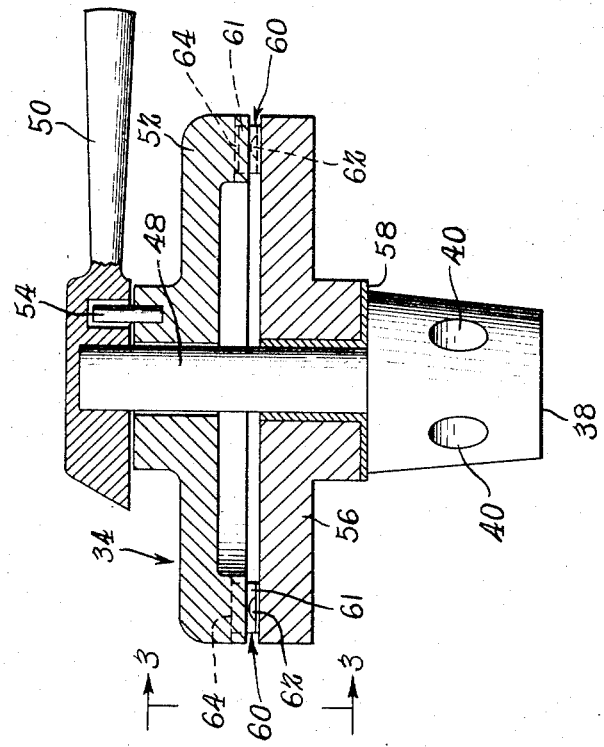
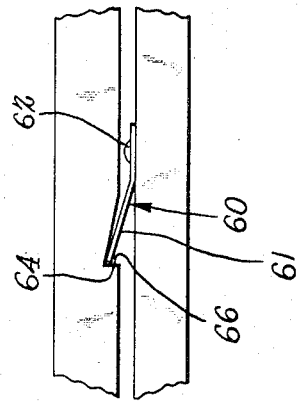

3,454,030
PRESSURIZED WASHING SYSTEM
Bertel S. Nelson, Hinsdale, Ill., assignor to Bicor Products, Inc., a corporation of Illinois
Filed Feb. 28, 1966, Ser. No. 530,551
Int. Cl. G05d *11/00;* B05b *9/00;* A62c *31/00*
U.S. Cl. 137—112                              4 Claims

ABSTRACT OF THE DISCLOSURE

A system for controlling the flow of pressurized fluid. A rotary valve has a fluid outlet, a first fluid inlet connected to a first fluid supply, and a second fluid inlet is connected to a second fluid supply. A pump, having an inlet port and an outlet port, has its inlet port connected to the fluid outlet of the rotary valve. A control valve is connected to the pumping outlet port and an hydraulic cylinder and piston arrangement is connected to the outlet of the pump and is responsive to the pressure at the pump outlet port. The rotary valve is connected to the hydraulic cylinder means and a switch is provided for starting and stopping the pump. Means are provided on the rotary valve for operating the switch in response to rotation of the rotary valve and the pressure responsive means also rotates the rotary valve to alternate the connection of the rotary valve outlet between the first fluid inlet including the first fluid supply and the second fluid inlet including the second fluid supply.

---

This invention relates to an improved system for controlling the flow of pressurized fluids, and it particularly relates to an improved system for controlling the flow of separate fluids in a pressurized washing system having rinse and wash cycles.

Recently, there has been introduced a new type of self-service car wash system. In this system, the car owners washes his car himself. Specifically, the operator is provided with a high pressure detergent and rinse water supply so that there can be alternate applications of detergent and rinse water to the automobile to properly clean it. In the known pumping systems, the operator is provided with a nozzle with an adjacent switch having an off position, a rinse position and a detergent position. These switch positions control the opening and closing of solenoid operated valves connected either to a detergent supply or to a rinse water supply.

One significant disadvantage of the foregoing arrangement is that the irregular movement of the high pressure hose connected to the nozzle causes breakage of the wires connecting the solenoid valves to the switch, since these wires extend the entire length of the hose. The twisting and turning of the hose ultimately result in the breakage of the electrical wire connections causing a system breakdown.

In view of the foregoing, it is an important object of the present invention to provide an improved system for controlling the flow of pressurized fluids wherein the system substantially avoids the disadvantages of prior art systems.

It is also an object of this invention to provide an improved system for controlling the flow of fluid in a pressurized system wherein the operation of the apparatus is effected primarily by fluid pressure.

It is a further object of this invention to provide an improved system for controlling the rinse and wash cycles of a pressurized washing system wherein the apparatus is arranged to avoid the use of solenoid controls for changing the fluid flow from clean water to detergent.

It is another object of this invention to provide an improved system for controlling the pressurized cycles in a pressurized washing system wherein the system is characterized by its simplicity and economy of construction and operation.

It is yet another object of this invention to provide an improved pressurized washing system wherein a highly unique arrangement is provided between the various components of the system so that the requirement of solenoid controlled and operated valves are substantially avoided and the control of fluid flow is accomplished primarily by the fluid pressure at the pump outlet of the system so that system breakdowns are greatly reduced.

Further purposes and objects of this invention will appear as the specification proceeds.

A particular embodiment of the present invention is illustrated in the accompanying drawings wherein:

FIGURE 1 is a plan view of my improved arrangement for the pressurized washing system;

FIGURE 2 is a partially sectioned, longitudinal view through the rotary directional valve used in the embodiment of FIGURE 1; and FIGURE 3 is a broken sectional view taken along the line 3—3 of FIGURE 2.

Referring particularly to FIGURE 1, my improved system 10 for pressurized washing is mounted upon a base 12. A pump 14 and an electric motor 16 are interconnected by a shaft 18 and are both mounted upon the base 12. In one particular embodiment for controlling the rinse and wash cycles of a car wash system, the pump 14 is a high pressure pump and is rated at 2 gallons per minute at 500 pounds per square inch. The pump 14 has a fluid inlet or suction side 20 and a fluid outlet or pressure side 22.

When the pump 14 is rated at 2 gallons per minute at 500 pounds per square inch pressure, the motor 16 is desirably rated at ¾ horsepower at 1,750 r.p.m. and operates on a 115 volt, 60 cycle alternating current, single phase circuit. Desirably, the motor is provided with a resilient mounting on the base 12. A switch box 24 is also mounted on the base 12 and has a main power toggle switch 26 which is in series connection with a valve control toggle switch 28 which, as will be explained hereinafter in greater detail, controls the operation of the motor 16 and pump 14. The motor and switch box 24 are innerconnected by a power cord 30. Also, a power supply cord 32, connected to one side of the switch 26, provides power for the switch box 24 and the motor 16.

A four-way rotary directional valve 34 is mounted upon the base 12 in close proximity to the switch box 24 and the valve switch 28 for purposes to be hereinafter described in greater detail. The base or stationary portion 36, which includes porting, of the rotary valve 34 is of conventional rotary valve construction and need not be described in detail. However, the rotating parts of the rotary valve 34 are of a particular construction as seen by referring to FIGURES 2 and 3. The valve lower portion 36, which is fixed to the base 12, rotatably receives a tapered plug portion 38 having ports 40 which are adapted to be aligned with the porting in the valve lower portion 36. Generally, as seen in FIGURE 1, the lower portion 36 of the valve 34 has four ports, spaced approximately 90°. Specifically, the valve has two inlets 42 and 43 spaced approximately 180° and an outlet 44 intermediate the two inlets 42 and 43. The port which is opposite the outlet 44 is closed by a plug 46. The ports 40 in the rotating plug portion 38 of the valve 34 are adapted to communicate with the inlets 42 and 43 and outlet 44 for every 90° rotation of the plug 34 in a clockwise direction, as viewed in FIGURE 1.

The rotatable tapered plug 38 includes an upstanding shank 48 which is secured to a handle 50. The handle 50 is secured to a plate member 52 by a pin 54. With this construction, the plug 38, the shank 48, the valve handle 50 and the plate 52 comprise a first rotatable assembly. A second rotatable member or plate 56 is mounted below the upper plate 52 and above the plug 38. The second member 56 is rotatable about the shank 48 as it is rotatably carried by the sleeve 58. It is important in our construction to provide a ratchet connection 60 between the rotating valve unit and the second rotatable member 56. The ratchet connection comprises a plurality of leaf spring members 61 which are tapered upwardly in the same direction and are secured to the upper surface of the second rotatable member 56 by screws 62. The springs are positioned at approximately 90° to the radii of the rotatable member 56. The lower surface of the plate 52 has downwardly tapered grooves 64 which receive the spring members 61 therein. The tapered grooves 64 have an upright wall 66 against which the end of the upwardly tapered spring members 61 abut so as to cause simultaneous rotation of the engaged parts when the thrust of the spirng 61 is against the wall 66. Preferable at least two ratchet springs 61 are utilized in our construction, along with four tapered groove 64 in the upper plate 52.

The ratchet connection 60 between the plate 52 and the second rotatable member 56 thus provides for rotation of both parts in one direction during engagement of the ratchet 60 while only the second rotatable member 56 rotates and the plate 52 remains stationary when the ratchet 60 is not engaged. Referring particularly to FIGURE 1, the ratchet mechanism 60 is arranged so that the plate 52 and handle 50 rotate in a clockwise direction simultaneously with the second rotatable member when the ratchet is engaged, and when the second rotatable member 56 rotates in a counter-clockwise direaction, the plate 52 and handle 50 remain stationary. The importance of this feature of the applicant's apparatus 10 will be more clearly seen as the specification proceeds.

The first inlet 42 of the rotary valve 34 is connected by means of a first inlet 68 to a detergent supply 70. The second valve inlet 43 is connected to a water supply line 72 which in turn connects the valves 34 to a water supply as a city water main or a well system. FIGURE 1 schematically shows the porting of the directional valve 34 wherein in the position shown there is a connection between the second valve inlet 43 and the valve outlet 44. In this position there can be no flow of detergent from the detergent supply 70 since the porting is such that the first inlet 42 and thereby the detergent supply 70 is connected to a plugged outlet 46. The rotary valve outlet 44 is connected to a pump suction or inlet line 74 which in turn leads to the fluid inlet 20 of the pump 14. As will be described, automatic rotation of the rotary valve 34 in 90° increments causes alternate connection between the valve outlet 44 and the first valve outlet 42 or second valve inlet 43 so that there is alternate connection either between the detergent supply 70 and the pump 14 or between the water supply 72 and the pump 14.

The pump 14 has a high pressure line 76, as a hose, connected to the pump outlet 22 while the opposite end of the line or flexible hose 76 is provided with control valve 78. The control valve 78 may be of conventional valve construction having a nozzle 80 through which the fluid passes and an actuating lever 82 which opens or closes the nozzle 80 so as to permit or stop the passage of fluid therethrough.

Near the fluid outlet 22, there is a branch line 84 connected to the line 76 and the branch line 84 extends to a valve actuating mechanism 86. The mechanism 86 is mounted on the base 12 and includes a hydraulic cylinder 88 to which the branch line 84 is directly connected so that the interior of the hydraulic cylinder 88 is at substantially the same pressure as the outlet 22 of the pump 14. A reciprocating hydraulic piston 90 and piston rod 92 are contained within the cylinder. The end of the rod 92 is rigidly connected to or abuts a spring piston 94 which is reciprocal within a spring cylinder 96. A spring member 98 is positioned within the spring cylinder 96 at the end opposite the connection between the spring piston and the piston rod 92. The spring is positioned to bias the spring piston 94 in a direction towards the hydraulic cylinder 88. Both the hydraulic cylinder 88 and spring cylinder 96 are secured to the base 12 by a plurality of support brackets 100.

The spring rating of the compression spring 98 contained within the spring cylinder 96 is sufficient to normally bias the piston 90 towards the pressure end 102 of the hydraulic cylinder 88 when the control valve 78 is open and water is passing through the nozzle 80 so that there is a reduced pressure at the pressure end as there is at the outlet of the pump 14. When the control valve 78 is closed so that there is no flow of water therethrough, the pressure in the pump outlet 22 and in the branch line 84 builds up rapidly to increase the pressure in the hydraulic cylinder 88 to such an extent that the hydraulic piston 90 overcomes the compression of the spring 98. This forces the spring piston 94 and spring rod 104 towards the directional valve 34. The outer end of the spring rod 104 is pivotally connected at 106 to a link 108. The link 108 in turn is pivotally connected to an outwardly and radially extending arm 110 which is affixed to the second rotatable member 56. In our construction, it is important that the travel of the spring piston 94 be such that a rotation of slightly more than 90° is imparted to the second rotatable member 56 for every complete reciprocation of the piston 90. This assures that the following groove 64 in the plate 52 will be engaged for each full stroke of travel of the spring piston 94.

The second rotatable member 56 is also provided with first and second outwardly extending radial arms 112 and 114 which actuate the valve toggle switch 28 in the switch box 24. Thus, upon rotation of the member 56 in a counter-clockwise direction, the toggle switch 28 is turned off by the arm 112 so that the pump 14 stops. Movement of the rotatable member 56 in a clockwise direction causes the second arm 114 to actuate the toggle switch 28 so as to cause the pump 14 to start operating once again.

In the operation of the system 10, the switch box 24 is first connected to a power source by means of the power line 32. The valve switch 28 will be in the on position if there is no pressure or reduced pressure in the cylinder 88 or in the off position if there is high pressure in the cylinder 88.

When the operator desires to start the pump 14, the main toggle switch 26 is turned to the on position so that an electrical circuit is activated up to the valve switch 28. If there is reduced or no pressure in the cylinder 88, the valve switch is in the on position so that the motor 16 starts and the pump 14 starts. If the operator has the lever 82 in the closed position so that there is no flow of fluid through the nozzle 80, pressure builds up rapidly in the high pressure line 76 and also in the branch line 84 so that the piston 90 moves away from the pressure end 102 so as to compress the spring 98 until the spring plunger 94 reaches its outer travel stop and to move the pivoted end 106 of the spring rod 104 outwardly. With this movement, the link 108 causes approximately a 90° counter-clockwise rotation of the second rotatable member 56, and the ratchet springs 61 engage the slots 64 in the plate member 52. The location and design of the parts are such that approximately at this point of ratchet spring engagement, the arm 112 on the second rotatable member 56 contacts the toggle switch 28 to turn it to the off position, thereby stopping the pump. Also if the cylinder 88, at the time of start-up, is under a high pressure, the toggle switch is already in the off position due to the action of the arm 112.

When the operator actuates the lever 82 so as to permit the flow of fluid through the nozzle 80, there is a decrease of pressure in the pressure line 76 and also in the branch line 84. This decrease in pressure causes the spring 98 to overcome the force exerted against the hydraulic piston 90 to thereby move the spring rod 104 away from the control valve 34, until the spring plunger 94 reaches its inward travel limit stop position. This pivots the second rotatable member 56 of the valve 34 in a clockwise direction, as well as the plate 52 because of the ratchet connection 60 therebetween. The design and location of parts are such that when the travel stop is reached, the porting 40 in the base 36 and in the plug 38 of the rotatable valve 34 are in substantial alignment. The pump 14 then may take clear water from the water supply 72, through the porting of the directional valve 34 and through the pump line 74 and then pass it through the high pressure line 76 and finally through the nozzle 80 of the control valve 78. The valve connection with the clear water results from the clockwise rotation of the plug 38 to change the valve porting. The plug 38 does not rotate in a counter-clockwise direction because of the ratchet connection 60. During operation, the rotatable member may float or oscillate depending upon the particular pressure in the cylinder 88. There is no rotation of the plate 52 or plug 38, however, until a high pessure is in the cylinder 88 as a result of the shut-off of the valve 78. Water under high pressure is discharged through the nozzle 80 against an object such as an automobile since the arm 114 has moved the toggle switch to the on position so as to start the pump 14 and motor 16.

When the operator desires to shift the fluid from the clear or rinse water to detergent, he releases the control valve lever 82 to stop the flow of fluid through the nozzle 80. When this occurs, there is a rapid build-up of pressure in the high pressure line 76 and thereby in the branch line 84. This high pressure greatly increases the pressure in the hydraulic cylinder 88 and forces the hydraulic piston 90 in a direction away from the pressure end 102 of the cylinder 88. This movement of the piston 90 moves the spring piston 94 and compresses the spring 98. This also causes outward movement of the spring rod 104 and because of the pivot connection 106 between the spring rod 104 and the link 108, the rotatable member 56 moves counterclockwise. During this counter-clockwise rotation, the first arm 112 on the second rotatable member 56 strikes the valve switch 28 to stop the motor 16 and pump 14.

When the operator again actuates the control valve lever 82, there is a reduction of pressure in the cylinder 88. This moves the piston 90 back to the pressure end 102 and ultimately imparts clockwise rotation to the rotatable member 56 and to the plate 52 and plug 38 because of the ratchet connection 60. The porting 40 in the plug is thereby rotated about 90° and is in substantial alignment with the detergent ports of the valve 34. The arm 114 also contacts the toggle switch 28 during this movement to again start the motor 16 and pump 14. Detergent then flows from the supply 70, through the valve 34, into the pump and out through the nozzle 80.

This sequence of operation continues until the automobile is cleaned. Thus, simply by operating the lever control 82 on a control valve 78, the operator is able to control the particular fluid which he desires to have going through the valve and also causes the motor and pump to operate when the fluid is flowing through the valve and causes the motor and pump to stop operating when the valve is closed. It is seen that there is a substantial avoidance of the use of electrical connections which are subject to frequent breakdowns. Only a single switch 28 is turned on and off in response to pivoting movements of the rotatable member 56 in the rotary valve 34. The applicant's construction also greatly reduces electrical hazards encountered with prior art devices. After the object has been cleaned, the operator may merely turn off the main switch 26 so as to inactivate the motor 16.

Although the foregoing description has been particularly directed to the use of a rotary directional valve, it is to be understood that other suitable valves, as a spool valve, which may be vertically reciprocal, may be used, as with a rotating camming mechanism which may reciprocate the spool valve.

What I claim and desire to secure by Letters Patent is:

1. A system for controlling the flow of pressurized fluid, said system comprising a rotary valve having a fluid outlet, a first fluid inlet connected to a first fluid supply, and a second fluid inlet connected to a second fluid supply, pump means having an inlet port and an outlet port, said inlet port being connected to said fluid outlet of said rotary valve, a control valve connected to the said pump outlet port for selectively reducing or increasing the pressure at said pump outlet port, means responsive to the pressure at the outlet of said pump means, said rotary valve being interconnected to said pressure responsive means, switch means for starting and stopping said pump means, to thereby start and stop the flow of fluid through said control valve, and means on said rotary valve for operating said switch means in response to rotation of said rotary valve by said pressure responsive means, said pressure responsive means responsive to increased or decreased pressure at the pump outlet to rotate said rotary valve to alternate the fluid connection of said rotary valve outlet from between said first fluid inlet, including said first fluid supply, and said second fluid inlet, including said second fluid supply.

2. The system of claim 1 wherein said pressure responsive means includes a hydraulic cylinder and piston means, said rotary valve includes a first rotatable member and a second rotatable member, said first rotatable member being pivotally connected to said hydraulic cylinder and piston means, said first and second rotatable members being interconnected by ratchet means so that said first and second rotatable members rotate simultaneously in one direction to start said pump means and change the connection of said rotary valve from said first fluid inlet to said second fluid inlet, while as said hydraulic cylinder and piston means rotates said first rotatable member in an opposite direction, said second rotatable member remains stationary, and said opposite movement stops said pump means through said switch means and said operating means on said rotary valve.

3. The system of claim 1 wherein said pressure responsive means comprises hydraulic piston and cylinder means, said cylinder means communicating with the outlet port of said pump means and said piston means being interconnected to said rotary valve, so as the pressure at said outlet increases when the flow of fluid stops passing through said control valve, movement is imparted to said piston means and thereby to said rotary valve, and as the fluid flow resumes through said control valve, the pressure at said pump outlet port decreases, permitting reverse movement of said piston within said cylinder so as to effect reverse movement of said rotary valve, thereby effectively starting said pump means.

4. The apparatus of claim 1 wherein drive means are provided for operating said pump means, and said switch means are electrically interconnected to said drive means for starting and stopping said drive means and thereby said pump means.

References Cited

UNITED STATES PATENTS

| 1,433,007 | 10/1922 | Harris | 137—112 |
| 1,473,481 | 11/1923 | Kleist | 251—230 X |
| 2,527,341 | 10/1950 | Walter | 137—625.22 X |
| 3,226,030 | 12/1965 | Rossi | 239—305 X |
| 3,246,845 | 4/1966 | Techler et al. | 239—126 X |

WILLIAM F. O'DEA, Primary Examiner.

DAVID J. ZOBKIW, Assistant Examiner.

U.S. Cl. X.R.

239—126, 305